United States Patent [19]

Negri

[11] 4,417,708

[45] Nov. 29, 1983

[54] INTERCHANGEABLE WING AIRCRAFT

[75] Inventor: Rosario O. Negri, Great Neck, N.Y.

[73] Assignee: Grumman Aerospace Corporation, Bethpage, N.Y.

[21] Appl. No.: 377,352

[22] Filed: May 12, 1982

[51] Int. Cl.³ .............................................. B64C 3/38
[52] U.S. Cl. ............................ 244/45 R; 244/117 R; 244/119; 244/120; 244/131; 244/124
[58] Field of Search .............. 244/117, 119, 120, 131, 244/124, 45 R; 46/76 R, 79, 80

[56] References Cited

U.S. PATENT DOCUMENTS

| | | | |
|---|---|---|---|
| 2,211,089 | 8/1940 | Serlin | 244/117 |
| 2,838,260 | 6/1958 | Christensen | 244/117 R |
| 4,116,405 | 9/1978 | Bacchi et al. | 244/45 R |
| 4,148,450 | 4/1979 | Neuhierl | 244/120 |

Primary Examiner—Trygve M. Blix
Assistant Examiner—Ivy M. Shum
Attorney, Agent, or Firm—Richard G. Geib

[57] ABSTRACT

A design system for aircraft that allows wings of various different planforms to be mounted interchangeably on a common fuselage. Each of the wings has wing semi-spans joined by a center section torque box that mounts the wing in a cut-out in the aircraft fuselage. The torque box has a quadrilateral structure including front and rear main center section spars. These center section spars have their ends connected to the front and rear main spars of the semi-spans to transmit wing loads into the fuselage. The length of the main center section spars are designed in accordance with the invention such that they can connect with the main spars of the wing semi-spans to position the quarter chord of the wing properly with respect to the center of gravity of the aircraft irrespective of the wing planform. Thus, aft-swept, forward-swept, or straight wings can be routinely interchanged on a common fuselage without effecting the positive static longitudinal stability of the aircraft. Interchangeable wings can be used with a common fuselage to produce either a high or a low wing configuration.

7 Claims, 10 Drawing Figures

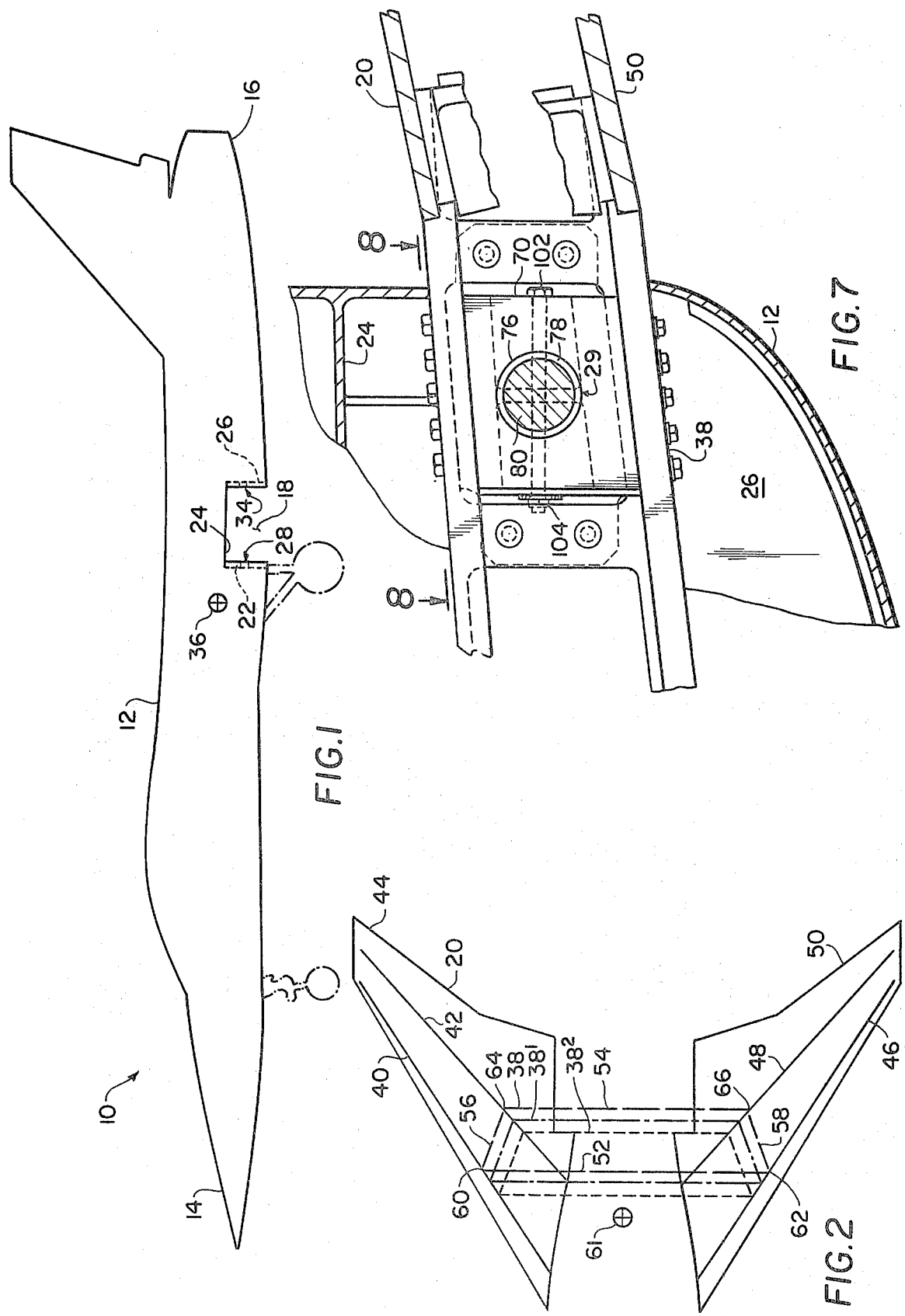

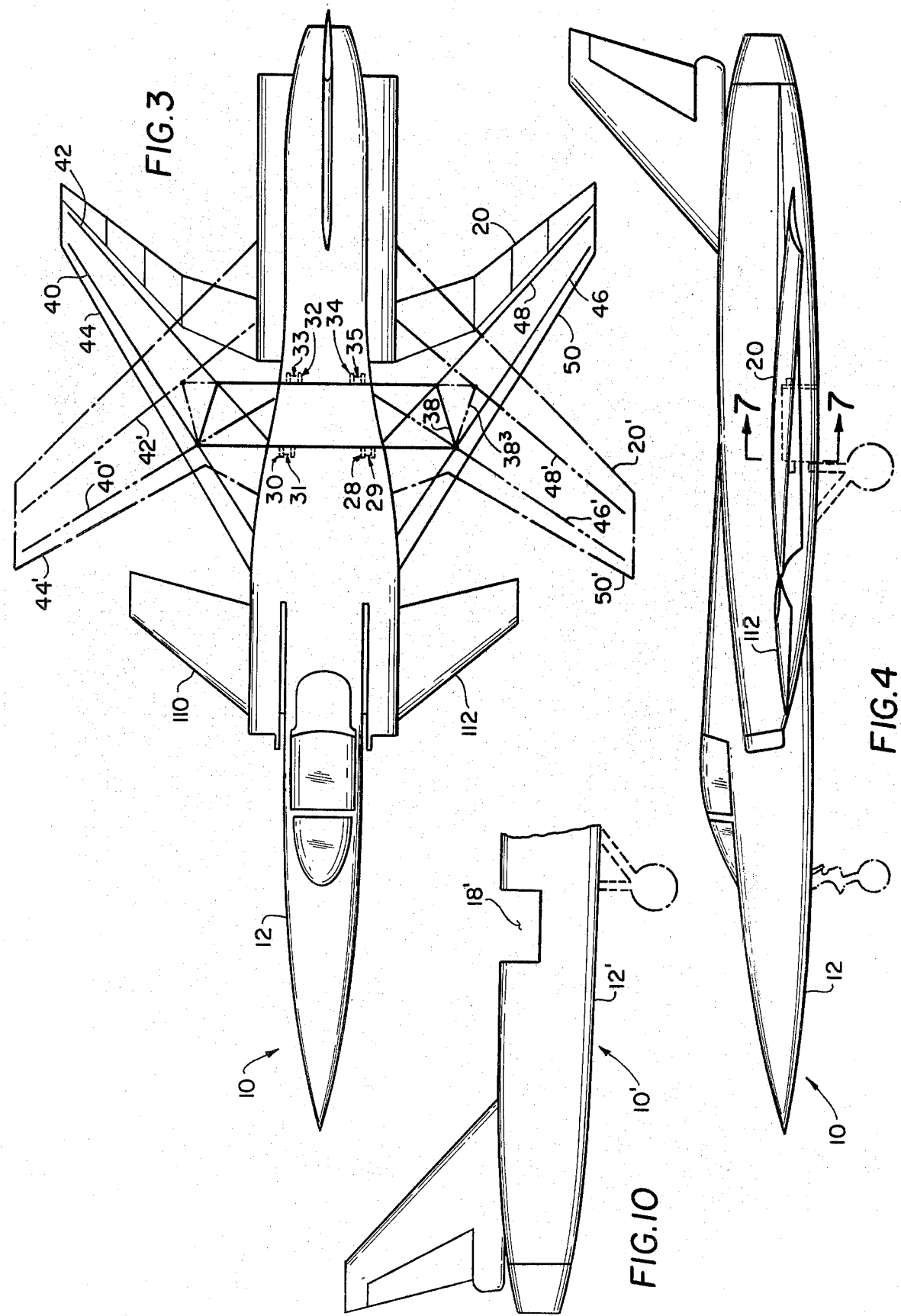

INTERCHANGEABLE WING AIRCRAFT

BACKGROUND OF THE INVENTION

1. Field of the Invention

This invention relates to aircraft and, in particular, to an aircraft design system that permits an aircraft having a common fuselage to be fitted interchangeably with wings of various different planforms.

2. Description of the Prior Art

In conventional practice, the fuselage and the wing of an aircraft are designed to meet the requirements of the mission or task assigned to it. When that mission is changed, the wings and fuselage of the aircraft intended for the changed mission are redesigned accordingly. For example, aircraft designed for military tractical missions would have a certain type of wing, whereas aircraft designed for a military intercepter role would have a different wing planform although their fuselages could be substantially identical. Wings of an aircraft whose primary function is to carry a heavy load would have a different planform from the wings of aircraft of the lightly loaded high-speed type. Hence, for a given function, in conventional practice, the aircraft would have to be designed to fulfill that function. With the advent of modern propulsion systems, particularly the latest gas turbines, sufficient power is available to permit an aircraft to serve multiple roles effectively, but such is militated against by the unavailability of any efficient universal wing configuration. Thus, although a common fuselage is suitable for multiple roles, the lack of a suitable common wing rules out such multiple role with conventional aircraft. If it were possible to interchange wings routinely and efficiently, it would be feasible to use a common aircraft for multiple roles with all the advantages such commonality offers. However, in conventional practice, it is not possible to routinely prepare an aircraft for a specific mission merely by changing the wings to a configuration particularly suitable for that mission. Nor is it possible to use a particular aircraft fuselage to test various different wing configurations to thereby speed up the development time and reduce the costs of such programs.

The instant invention is a design system for aircraft and for various wing configurations to be used therewith that allows a routine change of wings to be made to suit the requirements of any particular role of the aircraft. The wing employed in the invention is of the type having half wings or semi-spans attached to a center section by which the wing is mounted on the aircraft fuselage. The center section is also termed a wing or torque box.

A critical factor in the design of aircraft is the provision of positive static longitudinal stability. An important consideration in attaining a required positive static longitudinal stability is the correct location of the mean aerodynamic chord (practically: mean geometric chord) of the wing relative to the center of gravity of the complete aircraft. The contribution of the wing itself to stability depends primarily upon the location of the aerodynamic center of the wing with respect to the aircraft center of gravity. Generally, the aerodynamic center or a.c. is defined as the point on the mean aerodynamic chord where the wing pitching moment coefficient does not vary with lift coefficient. In the complete aircraft, the combination of wing-fuselage-stabilizer (and/or canard) alters the aerodynamic center from the quarter-chord point of the wing alone (the approximate location of the a.c.) to a position of 2 or 3 percent of the mean aerodynamic chord further forward of the center of gravity.

The center of gravity moves in flight and with different loading conditions (i.e., fuel consumption and/or payload drop). It is arranged to be between closely controlled limits; the most forward being around 0.15 mean geometric chord of wing and the most aft about 0.35 mean geometric chord of wing. The limits bracket the aerodynamic center of the wing, which lies at the quarter chord (0.25 mean geometric chord of wing) point. In view of these considerations, a change from a wing of one planform to that of another conventionally entails a redesign of the fuselage, at least in the wing mounting area, so the different wing will not compromise positive static longitudinal stability.

I have found, however, that by designing the torque boxes of the wings that are to be used with a common fuselage such that they pick up the forward and aft spars of the wings and by providing a fixed standard pattern of mounting (hard) points on the fuselage and a mating standard pattern of mounting points on the torque box, wings as diverse as a forward swept and an aft swept can be mounted interchangeably on a common fuselage and still maintain an acceptable value for aircraft stability.

The invention herein thus contemplates interchangeable wings for aircraft. In this invention, the interchangeable wings each have semi-spans joined by a center section or torque box that fits into a cut-out in the fuselage. To permit different wing configurations to be used with a common fuselage, the torque boxes and the wing semi-spans are designed according to the invention such that the quarter chord point of the mean geometric chord of the wing, when installed in the fuselage cutout, is positioned in close proximity to the center of gravity of the aircraft. It is possible, therefore, to use aft-swept, forward-swept, or straight wings interchangeably with a common fuselage. The fuselage cutout for the wings is defined at its forward and aft sides by structural bulkheads. The bulkheads are strengthened to pass into the fuselage structure the flight loads transmitted through the torque box by the wing. A set common pattern of wing mounting or hard points are provided on the fuselage bulkheads and on each of the torque boxes of the interchangeable wings. This provision of a set common pattern of wing mounting hard points permits the routine interchange of wings of various different planforms without adversely effecting the positive static longitudinal stability of the aircraft. This invention thus permits a wing configuration best suited for a particular mission to be routinely mounted on the aircraft.

It is, therefore, a principal object of the invention to provide an aircraft design system that permits wings having different planform configurations to be routinely interchanged without the re-design of the aircraft itself and/or the fuselage associated therewith being required.

Another object of the invention is to provide an aircraft design system that allows suitable wings to be interchangeably fitted to a common aircraft to obtain an optimum wing for the particular mission.

A still further object of the invention is to provide an aircraft design system that permits the retrofit of existing aircraft to permit the aircraft to accept different wing configurations interchangeably.

Yet another object of the invention is to provide an aircraft design system that permits the wing of an aircraft to be routinely changed to a configuration particularly suited for a particular task such that there can be a reduction in the inventory of types of aircraft required for operations.

A further object of the invention is to provide improved means for attaching wings of various designs to an aircraft, which means are of simple, uncomplicated construction permitting easy routine attachment and detachment of the wings, and which provide the required structural strength to pass wing loads into the fuselage structure of the aircraft.

Another object of the invention is to provide an aircraft design system which makes it feasible to fit wings of different planforms, such as forward swept, aft swept, or straight wings on a common aircraft fuselage without an unacceptable degradation in the aerodynamic balance of the aircraft.

Still another object of the invention is to provide standard fixed attachment means on the fuselage of the aircraft and on the wings to be used interchangeably therewith such that the required relationship of the aerodynamic center of the wing with respect to the center of gravity of the aircraft is maintained within acceptable limits during the routine interchange of wings of different planforms.

A still further object of the invention is to provide improved means of attaching wings of different planforms to an aircraft fuselage, which means are of rugged, uncomplicated design, which permit easy routine attachment and detachment of the wings, and which meet the required loads transmitted into the aircraft structure during all phases of flight.

Other objects and advantages will become apparent from a reading of the specification and a study of the accompanying drawings:

FIG. 1 shows a diagrammatic elevational view of the fuselage of an aircraft having a cut-out for receiving a wing structured according to the invention;

FIG. 2 shows a diagrammatic plan view of a wing illustrating various torque boxes usable therewith;

FIG. 3 is a plan view of an aircraft fitted with an aft-swept wing in accordance with the invention;

FIG. 4 shows a side elevational view of the aircraft of FIG. 3;

FIG. 7 shows a fragmentary view partially in section of means for attaching a wing to the fuselage;

FIG. 10 shows a fragmentary elevational view of another embodiment of the invention having a cut-out for receiving a wing in the upper portion of the fuselage thereof.

DESCRIPTION OF THE PREFERRED EMBODIMENT

Figure 5:
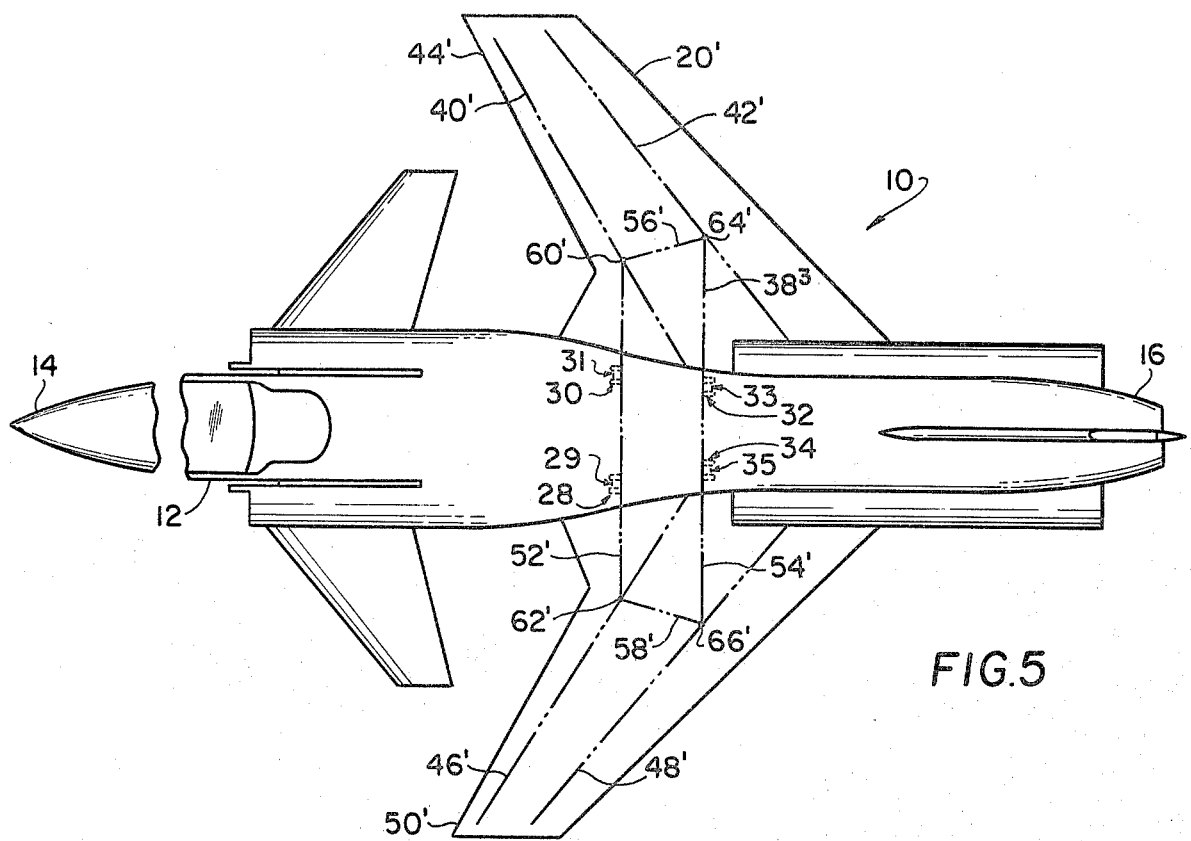
FIG. 5 is a fragmentary diagrammatic plan view of the aircraft of FIG. 3 fitted with a forward swept wing in accordance with the invention.

Now, describing the invention with respect to the various drawings herein, there is shown in FIG. 1 an aircraft 10 suitable for the interchangeable wings of the invention. Aircraft 10 has a fuselage 12 and the usual other components such as landing gear, propulsion means, and an empennage. Inasmuch as those components form no part of the invention, it is believed that it would serve no useful purpose to go into greater detail herein with respect thereto. Fuselage 12 has a forward end or nose 14 and an after end 16 and a cut-out 18 for receiving a wing 20. The forward surface of the cut-out is defined by a transverse structural bulkhead 22; the upper surface by transverse wal 24; and the after surface by a transverse structural bulkhead 26. Fixed on bulkhead 22 are wing mounting means, or hard points, 28 and 30 and on bulkhead 26 are wing mounting means, or hard points, 32 and 34. (See FIG. 3) The hard points and the bulkheads are designed to take the loads imposed on them by the wing during all phases of operation and flight and to pass those loads into the fuselage structure.

In widely used present day aircraft design practice, a wing has as basic elements a center section wing torque box at the root of the wing spanning the fuselage and wing semispans on either side thereof. Each semispan has a front and rear main spar connected into the torque box. The wing, including the component elements used, such as ribs, stringers, skins or covers, leading and trailing edges, tip caps, gloves, controls and control surfaces, and the like are built around the torque box and front and rear main spars. The torque box is provided with hard points 29, 31, 33 and 35 mating with the hard points 28, 30, 32, and 34 respectively in the bulkheads at the fuselage cut-out for mounting the wing on the fuselage. Design considerations require that the cut-out 18 be located with respect to the center of gravity 36 of the aircraft such that, when the wing is mounted on the fuselage, the quarter chord (0.25 mean geometric chord) of the wing falls directly under, or in the plane of, the center of gravity 36.

I have found, that by suitably structuring the torque box with respect to the front and rear main spars, that wings based thereon and having planforms as diverse as forward swept and aft swept configurations can be mounted interchangeably on a common fuselage with standard fixed hard points and the quarter chord of the various wings will fall as required on the center of gravity of the aircraft. FIG. 2 illustrates diagrammatically variations in the design of three different torque boxes 38, $38^1$ and $38^2$ that serve to vary the location of a swept back wing 20 with respect to the center of gravity of a fuselage. As indicated, wing 20 has at least a front main spar 40 and a rear main spar 42 in the starboard semispan 44 of the wing and a front main spar 46 and a rear main spar 48 in the port semi-span 50. Each torque box, as exemplified by torque box 38, is a substantially quadrilateral structure having at least a front center section spar 52, a rear center section spar 54, and a starboard rib 56 and a port rib 58 connecting the ends of the center section spars 52 and 54. The ends of the front center section spar 52 are connected at 60 and 62 to the front main spars of the wing semi-spans and the ends of the rear center section spar 54 are connected at 64 and 66 to the rear main spars such that the loads on the wing are transmitted into the torque box. It will be seen that, if the center of gravity of the aircraft is assumed to be at 61, the lengthening of the front and rear center section spars moves the wing itself forward with respect to center of gravity 61. Thus designing a wing 20 to have torque box $38^1$ will move the wing itself aft of the position it would have with torque box 38 and a design with torque box $38^2$ even further aft. FIGS. 3 and 4 are plan and sideviews respectively of a swept back wing such as wing 20 installed in the fuselage 12 of an aircraft 10.

In accordance with the invention, by suitably designing the wing torque box as shown in FIG. 2 to obtain the correct relationship between the wing quarter chord and the aircraft center of gravity, different wings having alternate planforms can be fitted interchangeably on fuselage 12 of aircraft 10. For example, should mission requirements so dictate as indicated in FIG. 3, a wing $20^1$ of forward swept planform can be installed on fuselage 12 of aircraft 10. As perhaps better shown in FIG. 5, wing $20^1$ has a torque box $38^3$ which has at least a front main center section spar $52^1$, a rear main center section spar $54^1$, and ribs $56^1$ and $58^1$ connecting the ends of the spars to form a quadrilateral load-carrying structure. The ends $60^1$ and $62^1$ of the front center section spar are connected to front main spars $40^1$ and $46^1$ respectively of wing semi-spans $44^1$ and $50^1$ and the ends $64^1$ and $66^1$ of the rear center section spar are connected to rear main spars $42^1$ and $48^1$ respectively of the wing semi-spans. Although the forward swept wing $20^1$ has a radically different planform than aft swept wing 20, when both are designed in accordance with the teachings of the invention such that the quarter chord of the wing is at about the center of gravity, the installation of the forward swept wing on a common fuselage using exactly the same mounting hard points as the aft swept wing does not adversely affect the aerodynamic balance of the aircraft. When a comparison is made in FIG. 3 between the torque box 38 of the aft swept wing 20 with the torque box $38^1$ of forward swept wing $20^1$, it will be seen readily that by lengthening rear center section spar $54^1$ of the torque box $38^1$ to effect a connection with the rear main spars $42^1$ and $48^1$ of the wing semi-spans, the quarter chord of the forward swept wing will be in the same correct relationship with the center of gravity of the aircraft as is the case with the aft swept wing 20. Correct wing positioning is assured even though the different planform wings are both mounted interchangeably on a common fuselage with the same common hard points.

Figure 6:
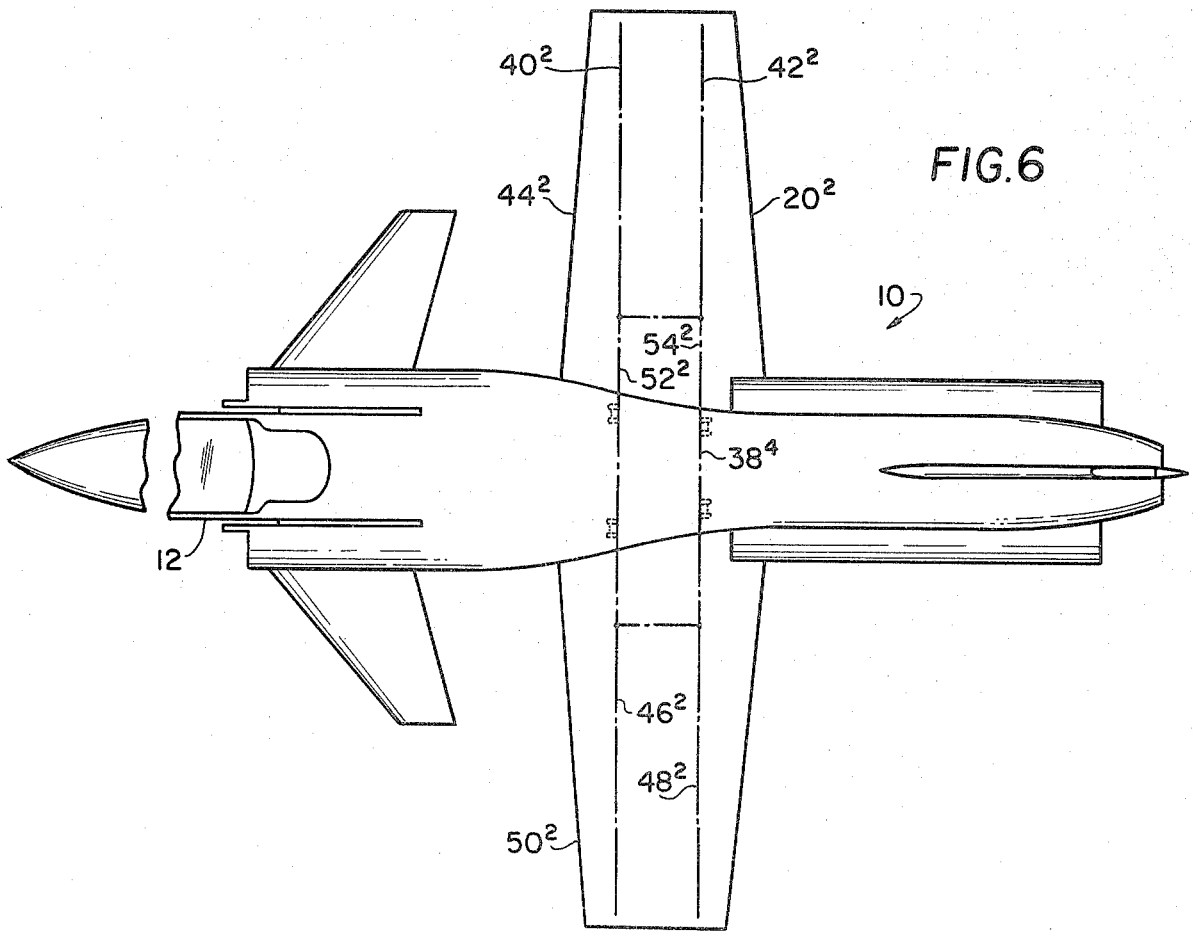
FIG. 6 is a fragmentary diagrammatic plan view of the aircraft of FIG. 3 fitted with a tapered straight wing in accordance with the invention.

Although the wing planforms embodied in FIGS. 3 and 5 are of the swept type, other planforms such as the straight wing type are feasible for use. As shown in FIG. 6, the interchangeable wing $20^2$ mounted on common fuselage 12 of aircraft 10 is provided with a torque box $38^4$ which positions the wing to bring the quarter chord of the wing into the correct relationship with the center of gravity of the aircraft. It is believed that the construction of the torque box and its relationship and connection of its front center section spar $52^2$ to the front main spars $40^2$ and $46^2$ and rear center section spar $54^2$ to rear main spars $42^2$ and $48^2$ of the wing semi-spans $44^2$ and $50^2$ are self evident in view of the preceding exposition of the embodiments of FIGS. 3 and 5; thus, in the interests of brevity, a further description of the construction details of the FIG. 6 embodiment will not be presented herein.

Figure 8:
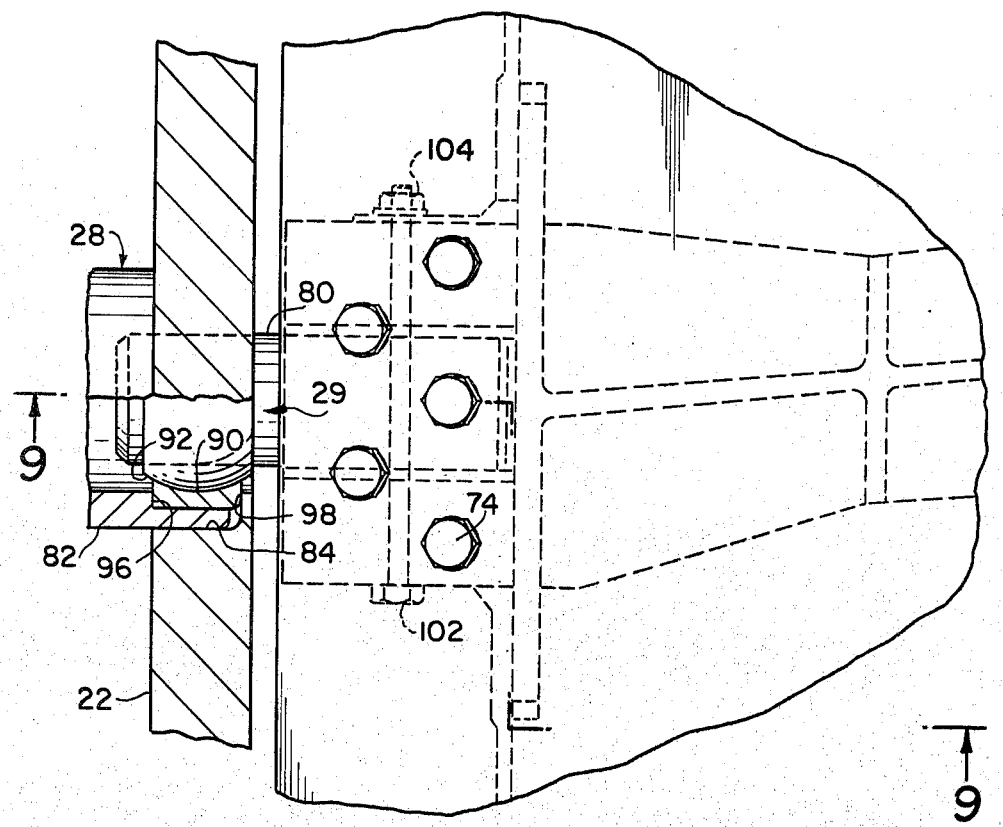
FIG. 8 shows a fragmentary view partially in section through line 8—8 of FIG. 7.
Figure 9:
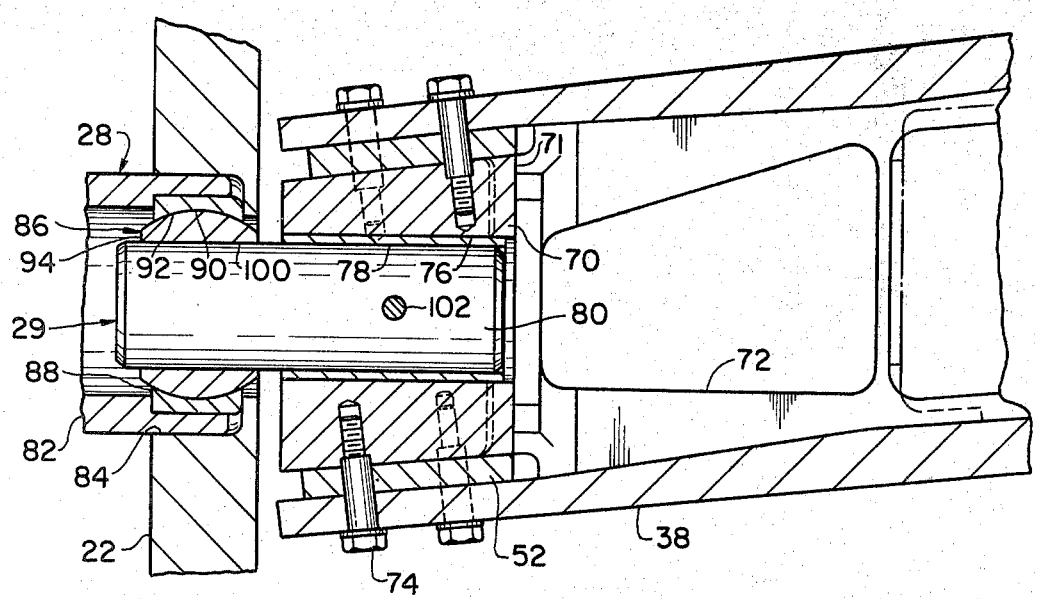
FIG. 9 shows a fragmentary view partially in secton through line 9—9 of FIG. 8.

The hard points themselves for mounting the interchangeable wings on the common fuselage can be of any known design in common use in aircraft construction. A typical example of a hard point construction suitable for use in the aircraft of my invention is shown in FIGS. 7-9. Irrespective of the design used, the hard points used should provide the requisite strength and allow routine, convenient wing interchange. In the design shown, each of the wing hard points 29, 31, 33, and 35 of the wing torque box is of substantially similar construction. For brevity of exposition, the following description will emphasize wing hard point 29 and its associated fuselage hard point 28, but it will be understood that the description will apply equally as well to the remaining hard points. Wing hard point 29 includes a mounting block 70 fixed at the end 71 of the torque box root rib 72 by means of bolts 74. Mounting block 70 is provided with a bore 76 having a sleeve 78 therein for the reception of wing interface pin 80. The mating hard point 28 on the fuselage 12 includes a sleeve 82 suitably fixed in an aperture 84 in transverse structural bulkhead 22 of the fuselage. Fitted in sleeve 82 is a self-aligning support 86 having an outer ring 88 which has an arcuate bore 90 that accommodates the spherical outer periphery 92 of an inner ring 94. Outer ring 88 is locked securely against movement between a shoulder 96 on sleeve 82 and a flange 98 on aperture 84. Inner ring 94 has an axial bore 100 into which wing interface pin 80 of wing hard point 29 fits. With this arrangement, the wing is positioned in cut-out 18 for mounting and the pins 80 are installed into axial bores 100 in supports 86 and the sleeves 78. Each pin 80 is retained securely in place in its sleeve 78 and mounting block 70 by a bolt 102 and lock nut 104 arrangement. Minor misalignment between the pin 80 and support 86 of the fuselage hard point 28 is compensated for during the installation procedure by a swivelling action of inner ring 94 in the outer ring 88 of the support. The wing is readily freed for removal by merely removing lock nuts 104, extracting bolts 102, and withdrawing the pins 80. It should be understood, of course, that the usual couplings and connections for the control and service circuits for the wings, whether electrical, hydraulic, or mechanical, will be provided. However, such means are well known and are not part of the present invention, thus, it is not believed necessary to describe such known means herein.

As shown in FIGS. 3 and 4, the aircraft of the invention may be provided with canard airfoil surfaces 110 and 112. If canards are fitted, it may be desirable to vary the surface geometry with different wing planforms.

It will also be recognized that construction details for the wing semi-spans and the torque boxes are reduced to the minimum for convenience of exposition and to avoid confusion in the drawings. The semi-spans and torque boxes will be built in accordance with normal approved practices and will have the usual ribs, stringers, wing covers, and the like. The designs of the various structural elements and their connections with one another will likewise follow usual approved industry practices. Interchangeable wing aircraft 10 is of a low-wing design. It will be appreciated that the invention also encompasses interchangeable wing aircraft having other than a low-wing configuration. For example, designs having other wing locations such as a high-wing configuration can be used. In such high-wing embodiment, the fuselage cut-out $18^1$ for the interchangeable wing would be located in the upper part of the fuselage $12^1$ of the aircraft $10^1$ as shown in FIG. 10. In all other respects, with obvious variations, high-wing aircraft $10^1$ will be substantially similar to low-wing aircraft 10.

Should design considerations so dictate, the aircraft can be provided with cut-outs in both the under and upper surfaces of its fuselage such that either high or low wing configuration can be selected at will. A fairing would be provided over the unused cut-out to reduce drag.

Although shown and described in what are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

Having thus described my invention, what I claim is:

1. An interchangeable wing aircraft comprising: a common fuselage having a cut-out for the reception of a wing, said cut-out having associated therewith wing mounting means including hard points fixed in a standard pattern on fuselage structure in close proximity to the center of gravity of said aircraft;

wings of different planforms to be used interchangeably with said fuselage, said wings having a center section which fits into said wing cut-out;

each of said wings having semi-spans joined at the roots thereof by a torque box center section which spans said fuselage transversely, each semi-span of each of said wings having at least a front main spar and a rear main spar;

said torque box having a standard pattern of hard points mating with said standard pattern of fuselage hard points for mounting said wing, each of said torque boxes having at least a front and a rear center section spar joined at their outer ends by ribs to form a quadrilateral load-carrying structure;

said outer ends of said front center section spar of said torque box being connected to said front main spars of said semi-spans and said outer ends of said rear center section spars of said torque boxes being connected to said rear main spars of said semi-spans of each of said wings for transmitting wing loads into said fuselage structure;

wherein the lengths of said front and rear center section spars of said torque boxes in each of the different planform interchangeable wings are selected to intersect for connection to said front and rear main spars of the semi-spans of said wings such that the quarter chord of each of said different wings is positioned at about the vertical plane of the center of gravity of said aircraft when said wings are mounted on said common fuselage.

2. The interchangeable wing aircraft defined in claim 1 wherein the interchangeable wing mounted on the common fuselage has a swept wing planform.

3. The interchangeable wing aircraft defined in claim 2 wherein the swept wing has an aft swept planform.

4. The interchangeable wing aircraft defined in claim 2 wherein the swept wing has a forward swept planform.

5. The interchangeable wing aircraft defined in claim 1 wherein the interchangeable wing mounted on the common fuselage has a straight wing planform.

6. The interchangeable wing aircraft defined in claim 1 wherein the wing cut-out and wing mounting means is on the underside of the fuselage of said aircraft.

7. The interchangeable wing aircraft defined in claim 1 wherein the wing cut-out and wing mounting means is on the upper side of the fuselage of said aircraft.

* * * * *